(12) United States Patent
Meinilä et al.

(10) Patent No.: US 7,203,223 B2
(45) Date of Patent: Apr. 10, 2007

(54) METHOD OF RADIO CHANNEL SIMULATION AND CHANNEL SIMULATOR

(75) Inventors: Juha Meinilä, Kuopio (FI); Torsti Poutanen, Salo (FI); Pertti Alapuranen, Sanford, FL (US)

(73) Assignee: Elektrobit Oy, Oulu (FI)

( * ) Notice: Subject to any disclaimer, the term of this patent is extended or adjusted under 35 U.S.C. 154(b) by 694 days.

(21) Appl. No.: 10/416,682

(22) PCT Filed: Nov. 14, 2001

(86) PCT No.: PCT/FI01/00988

§ 371 (c)(1),
(2), (4) Date: Sep. 10, 2003

(87) PCT Pub. No.: WO02/41538

PCT Pub. Date: May 23, 2002

(65) Prior Publication Data

US 2004/0044506 A1 Mar. 4, 2004

(30) Foreign Application Priority Data

Nov. 15, 2000 (FI) .................................. 20002504

(51) Int. Cl.
*H04L 5/16* (2006.01)
(52) U.S. Cl. .................................................. 375/220
(58) Field of Classification Search ................ 375/220, 375/224, 225, 226, 227, 228, 338; 370/210, 370/241, 247, 251, 252; 379/406.13, 406.01, 379/406.11, 406.12; 702/77, 108, 109, 110, 702/111, 112, 117, 120, 121, 122, 124, 125, 702/126; 708/403, 404, 405, 319, 420, 813, 708/5; 324/73.1, 600, 613, 614, 615; 779/406.14, 779/27.04; 455/67.11, 67.14, 119.1, 115.2; 714/30, 36
See application file for complete search history.

(56) References Cited

U.S. PATENT DOCUMENTS

| 5,062,148 | A | * | 10/1991 | Edwards | 455/506 |
| 5,191,594 | A | | 3/1993 | Argo et al. | 375/1 |
| 6,058,261 | A | * | 5/2000 | Rapeli | 703/6 |
| 6,236,363 | B1 | * | 5/2001 | Robbins et al. | 342/360 |
| 6,421,697 | B1 | * | 7/2002 | McGrath et al. | 708/420 |
| 6,512,788 | B1 | * | 1/2003 | Kuhn et al. | 375/224 |

FOREIGN PATENT DOCUMENTS

DE  4108095  9/1999

OTHER PUBLICATIONS

Crespo et al. "Computer Simulation of Radio Channels Using a Harmonic Decomposition Technique", Aug. 1995, IEEE, vol. 44, No. 3, p. 414-419.*

(Continued)

*Primary Examiner*—Khanh Tran
*Assistant Examiner*—Sam K. Ahn
(74) *Attorney, Agent, or Firm*—Ladas and Parry LLP

(57) ABSTRACT

The invention relates to a method of performing channel simulation and a channel simulator. The channel simulation is performed digitally. At least a section of a signal (206) to be fed to simulation is transformed by convolution transformation from time space to transformation space in tansformation means (200) of the channel simulator. In weighting means (202), the transformed signal (208) is weighted by a channel impulse response that is transformed from time space to transformation space. Finally, the resulting signal (210) is inverse-transformed in inverse-transformation means (204) to time space.

6 Claims, 3 Drawing Sheets

OTHER PUBLICATIONS

Mandarini, P. "Teoria Dei Segnali." EUROMA Editrice Universitaria di Roma—La Goliardica (1983) pp. 86 & 91-93.

Sklar, B. *Digital Communications Fundamentals and Applications* Second Edition, N.J., Prentice Hall PTR (2001) p. 149.

Proakis, J. F. *Digital Communications* Fourth Edition, N.Y. McGraw Hill (2000) p. 11.

Oppenheim, A. V., et al. "Elaborazione Numerica Dei Segnali." (1987) pp. 158-159.

Stephenne A. et al; Effective Multi-Path Vector Channel Simulator for Antenna Array Systems; IEEE Transactions on Vehicular Technology; vol. 49; No. 6; Nov. 2000; pp. 2370-2381.

\* cited by examiner

METHOD OF RADIO CHANNEL SIMULATION AND CHANNEL SIMULATOR

FIELD OF THE INVENTION

The invention relates to a radio channel simulator for the simulation of a radio channel.

BACKGROUND OF THE INVENTION

When transmitting a radio-frequency signal from a transmitter to a receiver in a radio channel, the signal propagates along one or more paths, in each of which the signal phase and amplitude vary, thus causing fades of different sizes in length and strength to the signal. In addition, the radio connection is also disturbed by noise and interference from other transmitters.

A radio channel can be tested either in actual conditions or in a simulator simulating actual conditions. Tests conducted in actual conditions are difficult, because tests taking place outdoors, for instance, are affected for example by the weather and season that change all the time. In addition, a test conducted in one environment (city A) does not fully apply to a second corresponding environment (city B). It is also usually not possible to test the worst possible situation in actual conditions.

However, with a device simulating a radio channel, it is possible to very freely simulate a desired type of a radio channel. In a digital radio channel simulator, the channel is modelled by a FIR (Finite Impulse Response) filter that forms a convolution between a channel model and a fed signal in such a manner that the signal delayed by different delays is weighted by channel coefficients, i.e. tap coefficients, and the weighted signal components are summed up. The channel coefficients are altered to reflect the behaviour of an actual channel.

Problems are, however, associated with using a FIR filter in a channel simulator. Calculation operations caused by multiplying by the channel coefficients and summing the delayed signals increase quadratically as a function of the number of FIR filter delay elements. Covering a long delay period by a large number of delay elements is thus not possible, because in the end it becomes impossible to perform the calculation sufficiently quickly. With a FIR filter, it is difficult to realize a delay that is not a multiple of the used delay unit. Such a delay can be achieved with an interpolation method, but forming the delay requires a great deal of calculation capacity. The delays of channel coefficients of signal components that propagated along different paths are not easy to float independently in a FIR filter employing direct convolution. A channel simulator is often also required to simulate a Doppler-shift. The extensive frequency-shifts of Doppler shifts are especially difficult to do in a FIR filter.

BRIEF DESCRIPTION OF THE INVENTION

It is thus an object of the invention to provide an improved method of simulating a radio channel and a channel simulator implementing the method. This is achieved by a method of performing channel simulation, in which method the channel simulation is performed digitally. Further, in the method, at least a section of the signal to be fed to simulation is transformed by convolution transformation from time space to transformation space; the transformed signal is weighted by a channel impulse response that is transformed from time space to transformation space; and the weighted signal is inverse-transformed to time space.

The invention also relates to a channel simulator that is adapted to perform channel simulation digitally. Further, the channel simulator comprises transformation means for transforming at least a section of the signal to be fed to simulation by convolution transformation from time space to transformation space; weighting means for weighting the transformed signal by a channel impulse response that is transformed from time space to transformation space; and inverse-transformation means for inverse-transforming the weighted signal to time space.

Preferred embodiments of the invention are disclosed in the dependent claims.

The invention is based on performing the convolution operation between the signal and the channel in transformation space as a weighting operation and returning the weighted signal to time space by inverse-transformation.

The method and system of the invention provide several advantages. The amount of calculation required in channel simulation is less dependent on the number of delay elements of the simulator than in the FIR implementation, which enables the simulation of a large number of delays. It is also simple to alter independently the partial fraction delays of the sampling period, and the delays of the Doppler shift and the different paths.

BRIEF DESCRIPTION OF THE FIGURES

The invention will now be described in more detail by means of preferred embodiments and with reference to the attached drawings, in which.

DETAILED DESCRIPTION OF THE INVENTION

The solution of the invention is especially suited for hardware implementation without, however, being limited to it. The hardware can be implemented for instance as an embedded system in a desired data processing device.

Figure 1:
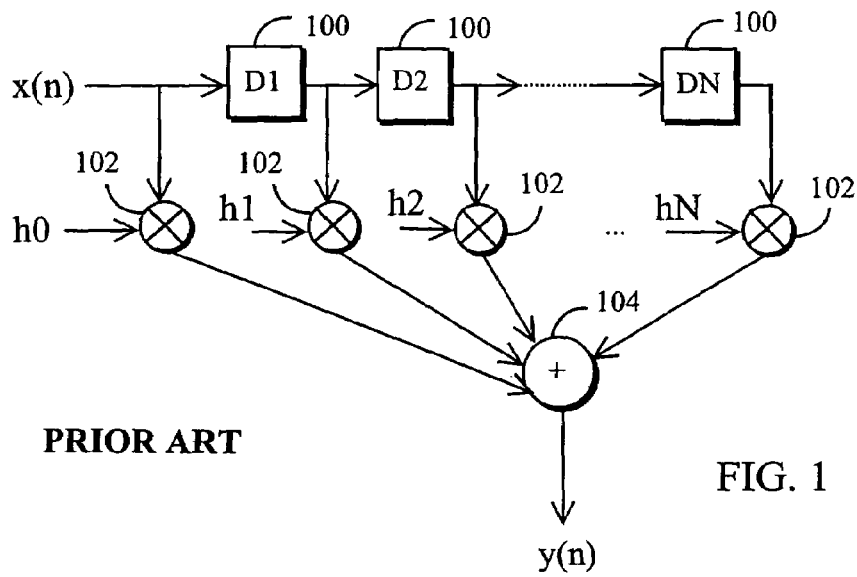
FIG. 1 shows a FIR filter.

Let us now first examine a prior-art part of a channel simulator that simulates a radio channel. The radio channel simulation is performed by means of a digital FIR filter, a block diagram of which is shown in FIG. 1. The FIR filter comprises delay elements 100 arranged as in a shift register, weighting coefficient blocks 102 and an adder 104. An input signal $x(n)$ is delayed in each delay element 100, the delays of which can be of equal or different length in time, and the delayed signals are weighted by a desired weighting coefficient h(i), wherein i=[1, ... , N], in the weighting coefficient blocks 102. The weighting coefficients h=[h(1), ... h(N)] are channel estimates of the radio channel and also called as tap coefficients of the FIR filter. The weighting coefficients are altered in the same manner as the properties of an actual radio channel are assumed to alter. The weighting coefficients are usually quite constant in a short time range, but alter slowly in comparison with the alteration rate of the signal. The delayed and weighted signals are summed in the adder 104.

Generally speaking, the weighting coefficients can be real or complex. Complex weighting coefficients are needed, because for instance the radio channels of a GSM (Global System for Mobile Communication) or CDMA (Code Division Multiple Access) system use quadrature modulation, in which the signal is divided into two sections. A real signal section I (Inphase) is multiplied by a carrier without a phase shift and an imaginary signal section Q (Quadrature) is multiplied by a phase-shifted carrier. The total signal is a combination of these sections. Multiplication by a carrier without a phase shift is performed for instance by multiplying the signal by a cosine carrier of form $\cos(\omega_c t)$. Multiplication by a phase-shifted carrier is in turn performed by multiplying the signal by a sine carrier of form $\sin(\omega_c t)$. Thus, carriers having a phase shift of $\pi/2$ between them are used in multiplying the signals. Because the different sections of the signal are orthogonal with respect to each other due to the $\pi/2$ phase shift, the signals can be presented in a complex manner. Then a signal x can be presented as x=I+jQ, wherein I is the real signal section, Q is the imaginary signal section and j is an imaginary unit.

In mathematical form, the output signal y(n) of the FIR filter can be presented as convolution that is a sum of the products of the delayed signal and the weighting coefficients:

$$y(n) = x * h = \sum_{k=1}^{N} h(k)x(n-k), \quad (1)$$

wherein * is the convolution operation and n is the signal element. The signals x and y and the channel impulse response h can be processed as scalar, a vector or matrix in a manner known per se.

Even though a direct convolution in a FIR filter is possible per se, a long-lasting impulse response causes the number of delay elements and weighting coefficient blocks to increase very much and the channel simulation requires a lot of calculation capacity. In the presented solution, the increase in the calculation capacity is slower than in a direct convolution. Approximately 50 delay elements and weighting coefficient blocks is probably the limit, after which the presented solution requires less calculation than the FIR implementation.

Figure 2:
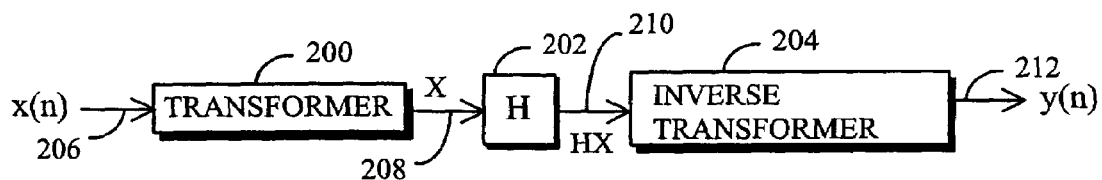
FIG. 2 is a block diagram of a channel simulator.

Let us now examine the presented solution by means of FIG. 2. In the presented solution, at least a section of the signal 206 (x(n)) to be fed to simulation is transformed by convolution transformation to transformation space in transformation means 200, whereby a transformed signal 208 (X) is created. The transformed signal 208 (X) is weighted in weighting means 202 by a channel response H transformed by convolution transformation, whereby a signal 210 (HX) is created. The weighting can be done by a multiplication operation. To speed up the calculation, the multiplication itself can also be performed by one or more mathematical operations without actual multiplication. Finally, the input signal 210 (HX) is inverse-transformed in inverse transformation means 204 to time space, whereby an output signal 212 (y(n)) is created.

The convolution transformation can be a Laplace, Z, or Fourier transformation, or the like. In their mathematical form, the Laplace, Z and Fourier transformations can be presented as follows:

$$L\{x(t)\} = X(s) = \int_0^\infty e^{-st} x(t) dt, \quad (2)$$

$$L^{-1}\{X(s)\} = x(t) = \frac{1}{2\pi j} \int_{-j\infty}^{j\infty} e^{st} X(s) ds, \quad (3)$$

$$F\{x(t)\} = X(\omega) = \int_{-\infty}^{\infty} e^{-j\omega t} x(t) dt, \quad (4)$$

$$F^{-1}\{X(\omega)\} = x(t) = \frac{1}{2\pi} \int_{-\infty}^{\infty} e^{j\omega t} X(\omega) d\omega, \quad (5)$$

$$Z\{x(n)\} = F(z) = \sum_{n=0}^{\infty} x(n) z^{-n}, \quad (6)$$

$$Z^{-1}\{X(z)\} = x(n) = \frac{1}{2\pi j} \oint_C X(z) z^{n-1} dz, \quad (7)$$

wherein L is a Laplace transformation, $L^{-1}$ is an inverse Laplace transformation, F is a Fourier transformation, $F^{-1}$ is an inverse Fourier transformation, Z is a Z transformation, $Z^{-1}$ is an inverse Z transformation, t is a time-space variable, s is a Laplace transformation space variable, $\omega$ is a Fourier transformation space frequency variable $2\pi f$, f is a frequency, z is a Z transformation space variable, n is a sample number in time space, and C is a closed path, along which the integration is performed. Even though all other transformations presented in the formulas except the Z and the inverse Z transformation are continuous, they can in a manner known per se be calculated discretely in a signal processing program.

In the presented solution, a fast discrete Fourier transformation and inverse Fourier transformation can advantageously be used. It is possible to reduce considerably the number of operations in a fast Fourier transformation, i.e. FFT. Usually a Fourier transformation requires $W^2$ operations, but FFT can preferably be performed with $W*\log_2(W)$ operations (Danielson-Lanczos theorem), wherein W represents the number of elements in the transformation. By transforming the signal vector x and the impulse response vector h of the channel to transformation space, i.e. when using FFT, to frequency space, the multiplication and inverse-transformation of the transformed signal block and impulse response block of the channel are faster than calculating a direct convolution for corresponding time-space variables after a certain impulse response length. The longer the impulse response vector of the channel, the greater the advantage is.

Figure 3A:
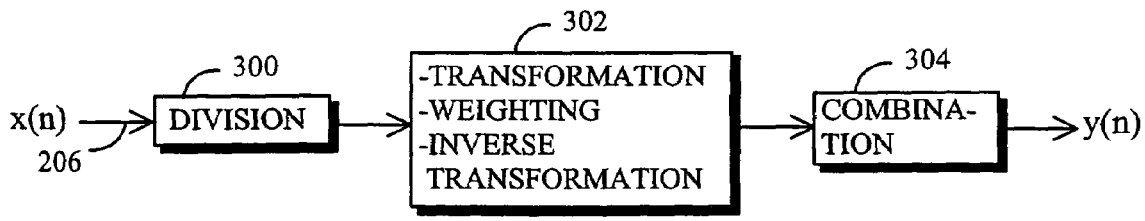
FIG. 3A shows a channel simulator, in which the signal to be fed to the simulator is divided into sections.
Figure 3B:
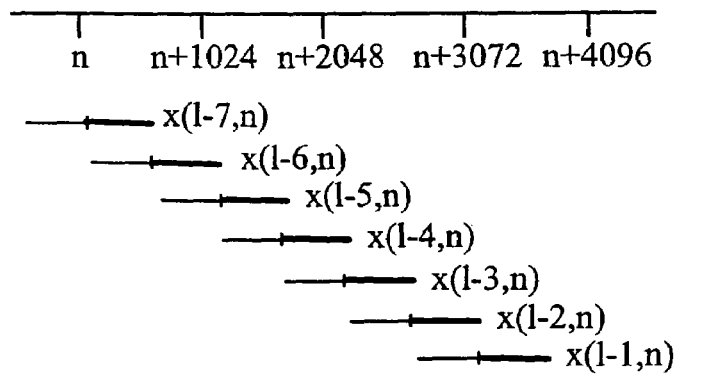
FIG. 3B shows the processing of a divided signal in the channel simulator.
Figure 4A:
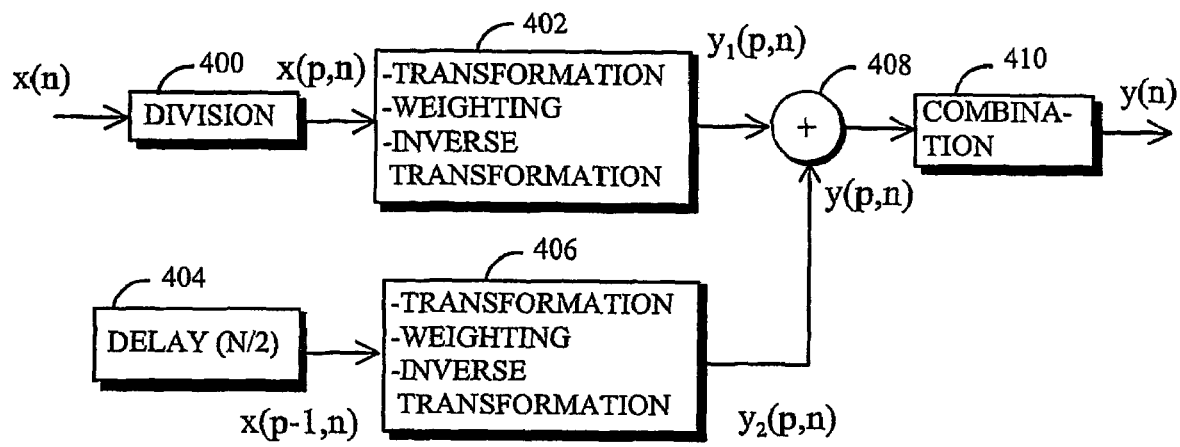
FIG. 4A shows a channel simulator, in which the channel impulse response is divided into sections.
Figure 4B:
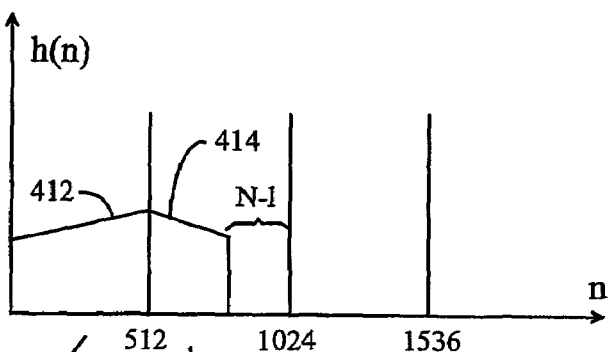
FIG. 4B shows an impulse response of a channel.
Figures 4C, 4D:
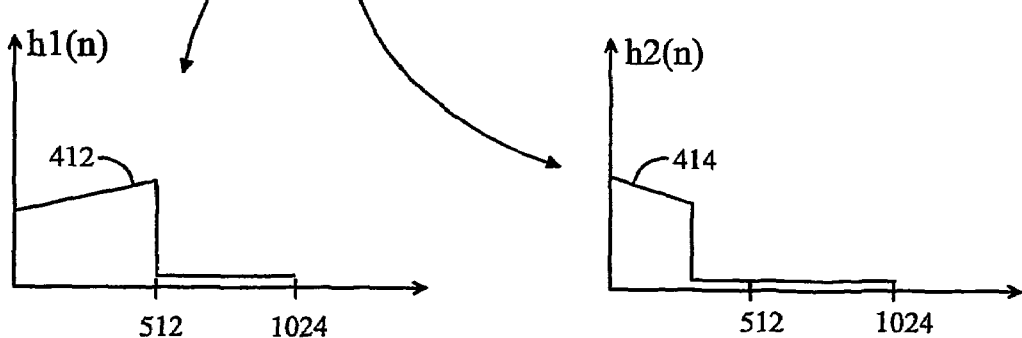
FIG. 4C shows a first section of the impulse response of a channel.
FIG. 4D shows a second section of the impulse response of a channel.

When performing a convolution operation in transformation space, the signal x to be transformed must be divided into sections, each of which comprises a suitable number of samples for the operation. The length of each section can be selected freely, but the number B of samples in each section is preferably a power of two, i.e. $B=2^K$, wherein K is a positive integer. Let us now by means of FIGS. 3A and 3B examine the operation of the channel simulator, when the signal is divided. The signal is divided into sections comprising a desired number of samples in block 300. Each section is convolution-transformed, multiplied by a transformed channel impulse response, and inverse-transformed in block 302 that corresponds to the block diagram of FIG. 2. Finally, the sectioning of the signal is removed in block 304.

Each sectional sequence of the signal can be for instance 1024 samples long. In block 302, the calculation can be performed for instance by what is known as an overlap-save method shown in FIG. 3B. When using FFT, the consecutive 1024-sample sections of the signal in the calculation . . . x(I−7, n)–x(I, n) . . . overlap for 512 samples. In the starting section of the channel impulse response h, there are 512 elements simulating the channel (typically non-zero) and the end section is filled with 512 elements having the value zero. After the transformed signal . . . X(I−7, n)–X(I, n) . . . and the transformed channel impulse response H are multiplied with each other, only 512 end-section elements (bold line) are accepted. The 512 starting-section elements are rejected, because a fast Fourier transformation corresponds to a circular convolution, not linear, in its starting section. The output of block 302 thus receives half of the number of elements in the signal section, i.e. in this example, 512 elements. This is why the last 512 of the old elements and 512 new elements are used in the next operation being performed. The input sequences are inverse-transformed and their sectioning removed in block 304.

When the number of elements used in the transformation is N and the number I of elements in the channel impulse response is higher than N/2, the channel impulse response can be divided into sections comprising N/2 sections. If the division does not come out even, the elements in the end section, N−I pieces, are set to zero. This solution is described in FIGS. 4A, 4B, 4C and 4D. An incoming signal x is divided into at least two sections in block 400, as in FIGS. 3A and 3B. The sectioned signal x(p, n), wherein n=1, . . . , N, having N/2 elements, is fed to block 402, in which the signal section x(p, n) together with the previous section x(p−1, n) is convolution-transformed, multiplied by one transformed section H1 of the impulse response 412 of the channel, and inverse-transformed. The second section x(p−1, n) of the signal, wherein n=1, . . . , N, is fed to a delay element 404, in which the signal is delayed by N/2 elements (sectioned signals used in the calculation, e.g. x(p, n) and x(p−1, n), are marked by a bold line in FIG. 3B). The delayed section is fed to block 406, in which it is convolution-transformed together with the previous section, multiplied by a second transformed section H2 of the impulse response 414 of the channel, and inverse-transformed. The output signals $y_1(p, n)$ and $y_2(p, n)$ from blocks 402 and 406 are combined into a signal y(p, n) in the adder 408 and the combined, but sectioned signal is reassembled in block 410.

By means of the presented solution, it is also possible to implement a delay of a fraction of the sampling period without much of an increase in the number of calculation operations. In time space, the implementation of a delay of less than a sampling period requires complex filtering, in which case it is possible that a multiple of the number of weighting coefficients is required in comparison with the original situation. For example, in frequency space of the Fourier transformation, a time-space delay corresponds to a phase shift as follows:

$$x(t-t_0) \Leftrightarrow X(\omega)e^{-j\omega t_0}, \quad (8)$$

wherein $x(t-t_0)$ is a delayed time-space signal and $X(\omega)$ is a Fourier-transformed signal. Multiplying the Fourier-transformed signal by factor $e^{-j\omega t_0}$ is a straightforward operation. Multiplying by factor $e^{-j\omega t_0}$ can be combined with the transformation of the channel impulse response, in which case the desired delay does not slow down the convolution calculation. The output $Y(\omega)$ of the weighting means 202 of FIG. 2 then becomes $Y(\omega)=e^{-j\omega t_0}X(\omega))H(\omega)$. Thus, the output signal has floated for time $t_0$, i.e. the time-space output signal becomes $y(t-t_0)$.

It is, also easy to take a Doppler shift into account in the simulation. The Doppler shift needs to be taken into account especially when simulating satellite channels. In time space, it is quite difficult to implement a Doppler shift with a FIR filter. For example, when using Fourier transformation in frequency space, the implementation is based on the following equivalence:

$$x(t)e^{j\omega_0 t} \Leftrightarrow X(\omega-\omega_0). \quad (9)$$

Thus, a frequency shift occurring in frequency space corresponds to multiplying the signal by $e^{j\omega_0 t}$ in time space, which is a simple operation. The Doppler shift can thus be implemented by multiplying the signal y(t) coming out of the simulator by $e^{j\omega_0 t}$ or by shifting the spectrum of the transformed signal $Y(\omega)$ cyclically by frequency $\omega_0$, $Y(\omega) \rightarrow Y(\omega-\omega_0)$, wherein $\omega_0$ is the frequency of the Doppler shift. Computationally, the fastest way is probably to shift the origin of frequency space cyclically during a Fourier transformation.

Figure 5:
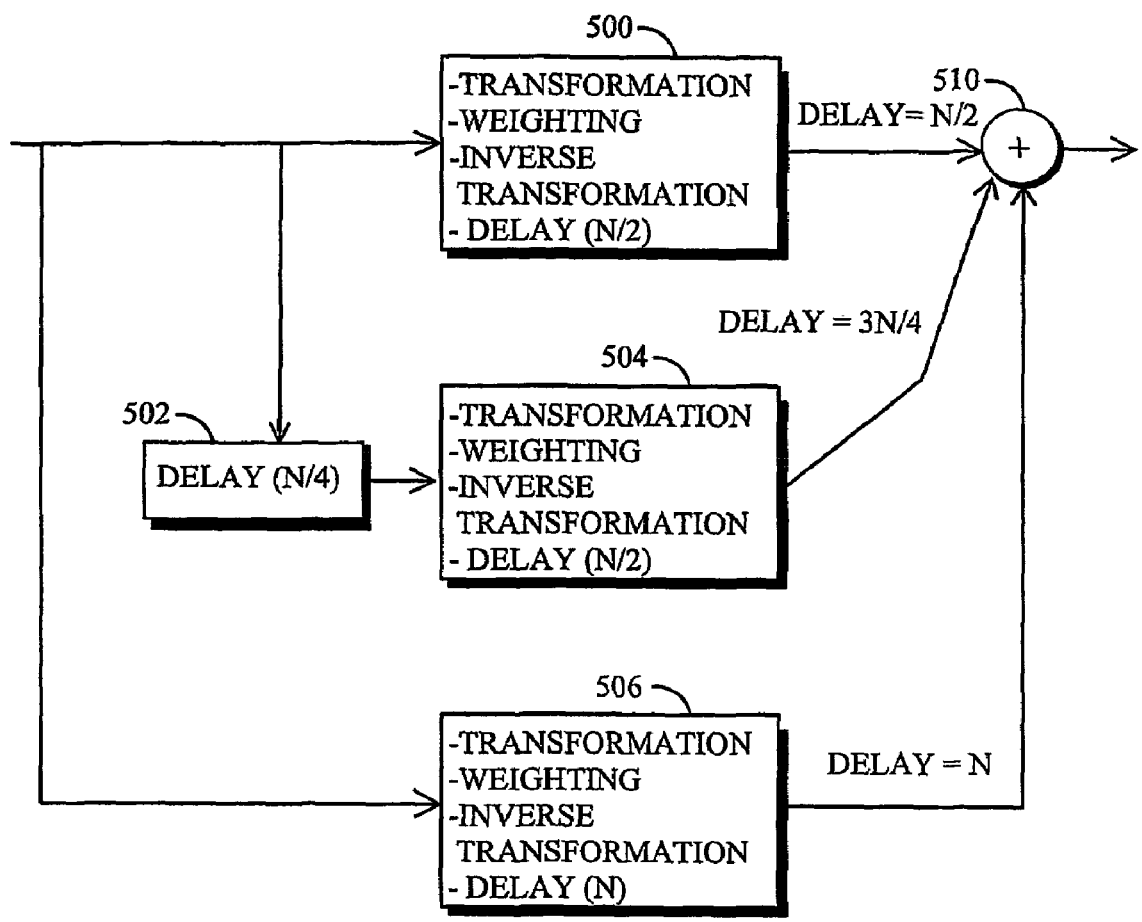
FIG. 5 shows a channel simulator, in which the channel impulse response is divided into sections of different sizes.

In channel simulation performed in transformation space and especially in frequency space, in which a signal comprising N elements and/or the channel impulse response are divided into sections, a delay of at least N/2 elements is created. Dividing the signal and/or the channel impulse response into sections of different lengths can reduce this delay. One possibility is to perform convolution for the starting section of the signal to be fed into the simulator and the channel impulse response, in which case the convolution can be calculated with shorter sections than the convolutions of other sections. FIG. 5 shows a block diagram of a channel simulator, in which the sections of the channel impulse response h are of different size. To reduce the delay, the original channel impulse response h having N elements is in this example divided into three sections, and the first impulse response h1 receives N/4 elements from the original impulse response, the second impulse response h2 receives N/4 elements from the original impulse response, and the third impulse response h3 receives N/2 elements from the original impulse response. The lengths of the impulse responses h1 and h2 are increased to be N/2 elements by adding N/4 zero elements to them. From the signal x coming to the simulator, N/4 first samples are fed to a first convolution calculation block 500, which in an ideal case produces a delay corresponding to N/2 samples. From the signal x, N/2 samples that are first delayed in a delay element by a time corresponding to N/4 samples are then fed to a convolution calculation block 504. In addition, from the signal x, N/2 samples are fed to a convolution calculation block 506. The delay of the first branch is thus N/2 samples, the delay of the second branch is 3N/4 samples, and the delay of the third branch is N samples. The output signals y1, y2, and y3 of all three convolution calculation blocks 500, 504, 506 are combined in an adder 510 to form the final output signal. The impulse response can also be divided in other ways than that shown in FIG. 5.

Figure 6:
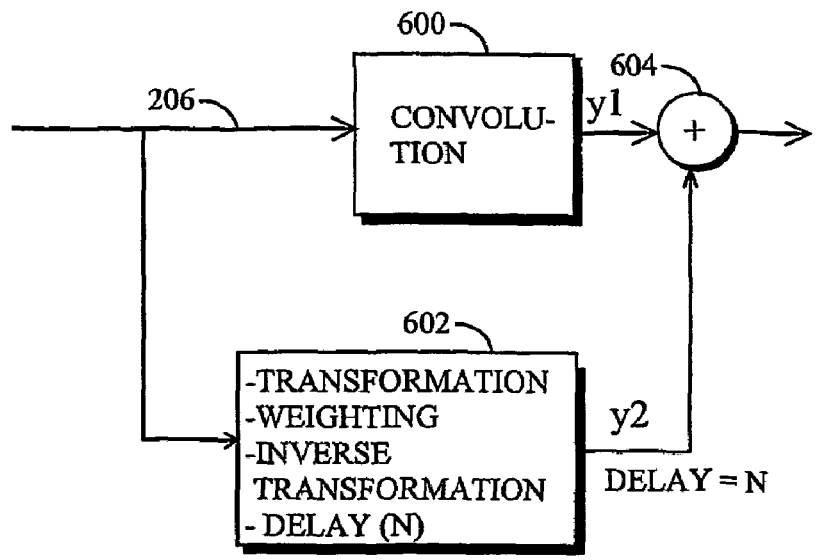
FIG. 6 shows a channel simulator, in which a part of the simulation is performed in a FIR filter and a part in a block utilising transformation space.

A second more efficient way to reduce the delay is to perform convolution calculation partly with a direct FIR transformation and partly in transformation space. This type of calculation is advantageous in that the convolution of the starting section of the channel impulse response and the signal is performed with a FIR filter and the convolution of the end section of the channel impulse response and the signal is performed in transformation space. FIG. 6 shows this solution. In this case, too, it is assumed that the channel impulse response has N elements. The division of the channel impulse response can be done for instance in such a manner that N/2 elements are selected as the weighting coefficients h1 from the original impulse response h for the convolution calculation performed in block 600 by a FIR filter and taking place in time space. N/2 elements from the original impulse response h are selected for the second impulse response h2 performed in block 602 and taking place in transformation space. The output signals y1 and y2 of both convolution calculation blocks 600, 602 are combined in an adder 604.

The solution of the invention can be implemented for instance in a personal computer in such a manner that the PC has its own accelerator card for channel simulation to calculate the FFT transformation, the product of the transformed impulse response H and the transformed input signal X, and the IFFT transformation.

Even though the invention has above been described with reference to the example according to the attached drawings, it is clear that the invention is not limited to it, but it can be modified in many ways within the scope of the inventive idea described in the attached claims.

The invention claimed is:

1. A method of performing channel simulation, in which method the channel simulation of a mobile radio system is performed digitally, the method comprising:
   transforming at least a section of a signal to be fed to simulation by convolution transformation from time space to transformation space;
   weighting the transformed signal by a channel impulse response that is transformed from the time space to transformation space;
   inverse-transforming the weighted signal to time space;
   dividing the channel impulse response into at least first and second sections wherein the channel impulse response comprises more elements than there are in the signal section to be fed to simulation;
   delaying the signal to be fed to simulation; and
   weighting each delayed signal section by the first section of the channel impulse response, and weighting the undelayed signal to be fed to simulation by the second section of the channel impulse response.

2. A method as claimed in claim 1 the method further comprising dividing the channel impulse response into sections, the length of which in elements is a power of two.

3. A method of performing channel simulation, in which method the channel simulation of a mobile radio system is performed digitally, the method comprising:
   transforming at least a section of a signal to be fed to simulation by convolution transformation from time space to transformation space;
   weighting the transformed signal by a channel impulse response that is transformed from the time space to transformation space; and
   inverse-transforming the weighted signal to time space; and
   performing the channel simulation for a first section of the signal being fed to the channel simulation by utilising the transformation space and for a second section of the signal being fed to the channel simulation by means of a FIR (Finite Impulse Response) filter in time space.

4. A channel simulator adapted to perform channel simulation of a mobile radio system digitally, the channel simulator comprising:
   transformation means for transforming at least a section of a signal to be fed into simulation by convolution transformation from time space to transformation space;
   weighting means for weighting the transformed signal by a channel impulse response that is transformed from the time space to the transformation space; and
   inverse-transformation means for inverse-transforming the weighted signal to time space,
   wherein the channel impulse response comprises more elements than there is in the signal section to be fed to simulation, the channel simulator is adapted to divide the channel impulse response into at least first and second sections;
   the channel simulator comprises at least one set of delay means for delaying the signal to be fed to simulation;
   the channel simulator is adapted to weigh each delayed signal to be fed to simulation that has been transformed to the transformation space by the first section of the channel impulse response; and
   the channel simulator is adapted to weight the undelayed signal to be fed to simulation that has been transformed to transformation space by the second section of the channel impulse response.

5. A channel simulator as claimed in claim 4, wherein the channel simulator is adapted to divide the channel impulse response into sections, the length of which in elements is a power of two.

6. A channel simulator adapted to perform channel simulation of a mobile radio system digitally, the channel simulator comprising:
   transformation means for transforming at least a section of a signal to be fed into simulation by convolution transformation from time space to transformation space;
   weighting means for weighting the transformed signal by a channel impulse response that is transformed from the time space to the transformation space; and
   inverse-transformation means for inverse-transforming the weighted signal to time space,
   wherein the channel simulator is adapted to perform the channel simulation for a first section of the signal to be fed to channel simulation utilising the transformation space, and the channel simulator comprises a FIR (Finite Impulse Response) filter that is adapted to perform the channel simulation for a second section of the signal to be fed to channel simulation in time space.

* * * * *

UNITED STATES PATENT AND TRADEMARK OFFICE
CERTIFICATE OF CORRECTION

| | | |
|---|---|---|
| PATENT NO. | : 7,203,223 B2 | Page 1 of 1 |
| APPLICATION NO. | : 10/416682 | |
| DATED | : April 10, 2007 | |
| INVENTOR(S) | : Juha Meinila et al. | |

It is certified that error appears in the above-identified patent and that said Letters Patent is hereby corrected as shown below:

On title page, item 73, after "Elektrobit" insert -- Testing -- and "Oulu" should read -- Oulunsalo --.

Signed and Sealed this

Fourth Day of September, 2007

JON W. DUDAS
*Director of the United States Patent and Trademark Office*